United States Patent Office 2,779,914
Patented Jan. 29, 1957

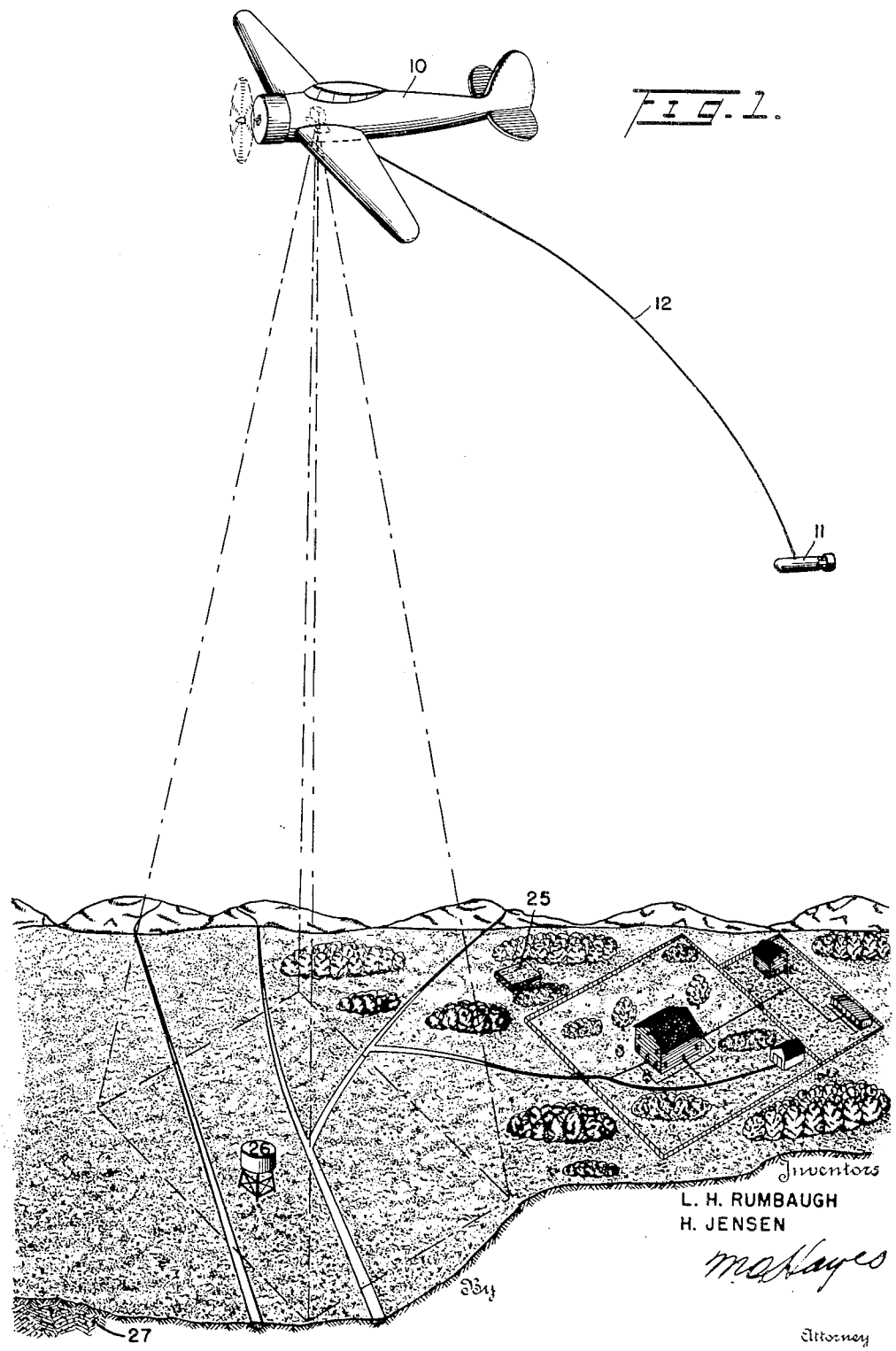

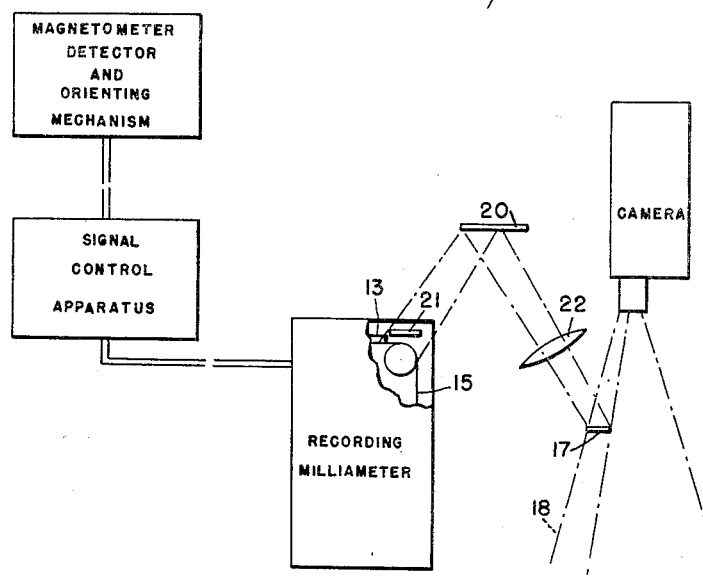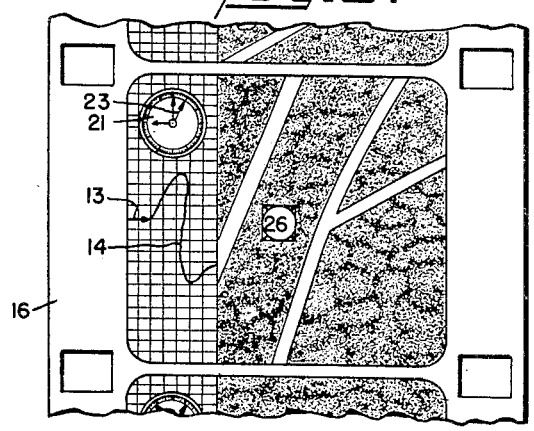

2,779,914

MAGNETIC EXPLORATION APPARATUS

Lynn H. Rumbaugh and Homer Jensen, Philadelphia, Pa.

Application June 11, 1946, Serial No. 676,050

2 Claims. (Cl. 324—4)

(Granted under Title 35, U. S. Code (1952), sec. 266)

This invention relates generally to methods and apparatus for conducting magnetic explorations or surveys from an aircraft in flight and more particularly to a new and improved method and apparatus for correlating geographical positions disposed along the traverse of the aircraft with magnetic anomalies of geological origin or other variations in the ambient magnetic field above the earth as measured or detected from the aircraft.

Variations in the ambient magnetic field above the earth are due principally to variations in the earth's magnetic field which varies regionally from about 25,000 gammas near the equator to about 70,000 gammas near the magnetic poles. One gamma is equal to $10^{-5}$ oersted, the unit of magnetic field intensity. Locally, however, the variations in the earth's magnetic field are usually much smaller and depend upon the local magnetic structure of the earth, principally upon the amount of magnetite-bearing rock present.

In conducting magnetic surveys, maps of the magnetic rock formations are prepared from data obtained from measurements of the earth's field by use of a magnetometer, and from such maps, the formation of related structures are deduced. In oil regions, for example, the magnetic rocks are usually buried deeply beneath sediments of relatively low and homogeneous magnetic permeability, and the variations measured by a magnetometer are characteristically smooth and of low gradient, being only a few gammas per mile in some cases. In other regions, rocks of widely varying permeability lie near the surface and gradients of many thousands of gammas per mile may be measured.

Local variations in the ambient magnetic field above the earth also are due to the presence of magnetic objects such, for example, as submarines, sunken vessels and the like; camouflaged tanks, guns, ordnance plants and the like; and steel tanks, fences, rails, pipes, and other ferrous objects usually associated with urban or metropolitan areas. Theoretically, it is possible for a distribution of such local magnetic material to indicate falsely the existence of a large magnetic structure of geological origin. Such magnetic irregularities, however, attenuate rapidly with altitude and usually have little effect on an airborne magnetometer. In submarine detection, for example, it is necessary that the aerial traverses be made at low altitudes and that a detector having a sensitivity in the order of one gamma be employed.

The attenuation of the magnetic field with altitude is of advantage in preparing magnetic maps for the reasons that non-geological anomalies become obscured at high altitudes, and that in making traverses at different altitudes, it is possible to measure the vertical variation in the magnetic field and obtain positive information of depth. Fine details of the magnetic field are thus obtained from low altitude traverses and broad features of the field are obtained from measurements thereof at higher altitudes.

Heretofore, diverse methods have been employed for identifying the signal obtained from an airborne magnetometer with the magnetic source which produces it. In some cases, for example, as significant deflections of a signal-driven recorder or meter are observed, notations regarding identifiable landmarks and the like are recorded by the operator or pilot in a log book or on a paper record providing a continuous trace of the signal, thereby to obtain data from which to correlate the signal with the source producing it by identifying the signal with landmarks observed visually from the aircraft. In special cases in which the terrain may consist of an unbroken system of roads and highways on section lines and in which the magnetic field is of low gradient, appropriate marks may be made on the record tape as the roads pass under the apparent plumb-point of the plane, as judged by eye.

Generally, magnetic explorations or surveys in which human observations are relied upon to establish a correlation between the signal and the source producing it have not been entirely satisfactory for the reason that data obtained by such methods is insufficiently detailed and accurate for preparing magnetic maps therefrom, such methods usually being incapable, in principle, of yielding from adjoining traverses, data which can be correlated.

In accordance with the method and apparatus of the present invention, the signal is correlated with the ground position beneath the plumb point of the aircraft by superimposing an image of the signal trace on the recorded image of the terrain, an optical system being employed to split the field of view of a camera adapted to photograph the terrain whereby the camera is adapted to photograph the trace of the signal and thus provide a composite record of signal and ground position. Means indicative of the altitude at which a given traverse is being conducted also is included within the field of view of the camera, thereby to provide additional data on the composite record which may be useful in the preparation of magnetic maps covering the area traversed.

It is a broad object of the present invention therefore to provide a new and improved method and apparatus for conducting magnetic explorations from an aircraft in flight.

Another object is to produce correlative records of data obtained from an aircraft in flight and relating to geographic positions disposed along the traverse of the aircraft and variations in the ambient magnetic field detected therefrom.

Another object is to correlate a signal obtained from an airborne magnetometer with identifying landmarks associated with the magnetic source which produces the signal.

Another object is to correlate a magnetometer signal obtained from an aircraft in flight with the magnetic source the signal by simultaneously providing permanent records of the signal and ground positions corresponding thereto and disposed along the traverse of the aircraft.

Another object is to correlate the magnetometer signal with ground positions corresponding thereto by providing a composite photographic record of images of the terrain disposed along a given traverse, a trace of the signal, and means indicative of the altitude at which the traverse is made.

A further object is to provide an optical system adapted to split the field of view of a camera employed to photograph the terrain from an aircraft in flight and superimpose upon the image of the terrain thus provided, an image of a signal trace providing a continuous record of variations in the ambient field above the earth as detected from the aircraft.

Still other objects, features and advantages of the present invention are those inherent in or implied from the novel combination and arrangements of parts wherein the aforedescribed method of the invention is practiced, the foregoing being accomplished by the specific devices and in the specific manner hereinafter more fully to appear, reference being had to the accompanying drawings wherein:

Fig. 1 is a schematic view illustrating an arrangement of an aircraft and a detector supporting body adapted to be towed thereby and suitable for use in conducting magnetic explorations in accordance with the method of the present invention.

Fig. 2 is a diagrammatic view of the complete apparatus which is supported in part on the aircraft and in part on the body towed thereby and suitable for use in conducting magnetic explorations according to the method disclosed herein; and Fig. 3 is a plan view of a frame of film illustrating the composite record obtained from a magnetic survey conducted according to the method and by use of the apparatus of the present invention.

Referring now to the drawings for a more complete understanding of the invention, and more particularly to Fig. 1 thereof, there is shown thereon an aircraft 10 which may be of any suitable type adapted to accommodate the apparatus hereinafter to be described, and in some cases being of sufficient size and proper structure to accommodate within the tail cone of the aircraft itself, the elements comprising the magnetometer detector.

In the preferred arrangement, however, the detector apparatus is carried within a nonmagnetic housing 11 adapted to be towed as by a cable 12 from the aircraft at a sufficient distance therefrom to avoid the influence of the magnetic field of the aircraft and that of the signal control apparatus carried thereby. Use of the towed housing, referred to hereinafter as a bird, also is of advantage over the inboard installation for the magnetometer detector for the reason that the aircraft may be operated at higher altitudes which greatly increases visibility and the safety of operation when traverses are made at low altitudes. The bird, however, must be aerodynamically stable in flight in order to avoid the generation of spurious signals in the detector upon sudden changes in position of the bird. A suitable type of bird is disclosed in the copending application of G. O. Haglund for Aerodynamic Body, Serial No. 671,341, filed May 21, 1946, now Patent No. 2,551,596, issued May 8, 1951.

Referring now to Fig. 2, the recording milliammeter shown thereon may be of any suitable type having a recording pen 13 adapted to be driven variably in accordance with electrical signals applied to the recorder from the signal control apparatus which operates in response to changes in the ambient magnetic field sensed by the magnetometer detector. The pen 13 is thus caused to leave a trace 14 (Fig. 3), of the signal on the recording paper 15 which is caused to move at a constant rate with respect to the pen in accordance with the usual manner of operation of recorders. For the foregoing purpose, the recorder may be a conventional spring-driven type such, for example, as that well known in the art as an E—A recorder.

The apparatus comprising the magnetometer detector and signal control apparatus may be of any suitable type adapted to produce electrical signals suitable for driving the recorder in response to changes in the order of one gamma in the scalar value of the ambient magnetic field above the earth as the aircraft moves along a given traverse. For this purpose, the apparatus preferably comprises the standard Navy equipment identified as the AN/ASQ-3A type airborne magnetometer detector, and reference may be had to the operating and maintenance instructions therefor, identified as AN-08-10-252 and CO-AN-08-20-14 respectively, for further details of construction and operation. These reports are available in photostat or microfilm form at the Office of Technical Services, Department of Commerce, the report numbers designating these reports being PB-27559 and PB-27560 respectively. The titles and report numbers of related subject material are available in a pamphlet No. OTS-302 published July 24, 1946 by the Office of Technical Services, Department of Commerce. Accordingly, it will suffice merely to allude herein to the principal features of the AN/ASQ-3A equipment.

The magnetometer detector comprises three mutually perpendicular field sensing elements, each of which consists of a single winding containing a core in the form of a rolled sheet of thin high-permeability material such, for example, as Permalloy. When the coil of such an element is driven by a strong sinusoidal current from a high-impedance source, the voltage across the coil becomes distorted and produces frequency components which are odd harmonics of the driving frequency. If the flux induced by an ambient unidirectional magnetic field is also present in the core of the element, the even harmonics of the driving frequency also appear and their polarity is determined by the direction of the field. Thus, if the axis of the coil is maintained in constant alignment with the direction of the ambient field, changes in the strength of that field are indicated by changes in the strength of the even harmonics.

The magnetometer detector unit comprising the coils is mounted in one end of the bird 11 on a gimbal orienting mechanism whereby one of the field sensing elements, hereinafter referred to as the detecting element, is adapted to be maintained in alignment with the vector representing the total magnetic field as the bird changes position in flight in response to maneuvering of the towing aircraft. For this purpose, an orienting motor unit having flexible driving connections with the gimbal mechanism is mounted in the opposite end of the bird and operates under control of the electronic control apparatus carried in the aircraft to orient the field sensing unit in the two planes of the gimbal axes in response to deviations of the detector element from the direction of the ambient field, the control apparatus, for this purpose, being driven by signals generated by the other two of the field sensing elements, hereinafter referred to as the orienting elements, as these elements move out of their normal null-pickup or right-angular relation to the direction of the ambient field.

The electronic control apparatus comprises a converter unit which changes the signals generated in the field sensing elements into a form suitable for actuating the recorder, an oscillator unit which furnishes driving current to the coils of the field sensing elements and also contains the circuits which control the orienting motors, a dynamotor unit which supplies a regulated B voltage from the power supply of the aircraft, and a control box in the output of the converter which provides selectivity control as to frequency response, control over the sensitivity of the instrument, and control of the nulling current which establishes the base settings of the instrument, as will appear more fully hereinafter.

When the magnetometer detector is in the desired orientation, one of the field sensing elements is in perfect alignment with the direction of the field and the entire signal, proportional to the strength of the total field is generated thereby, the orienting elements being at right angles or in null-pickup relation to the field. When the detector element deviates from its desired orientation, however, each of the field sensing elements generates an even harmonic signal proportional to the component of the magnetic field parallel to the axis thereof.

The output signal of each field sensing element is passed through a control channel individual thereto wherein the signal is filtered to eliminate all harmonics except the second harmonic therefrom and is applied to an amplifier designed so that its output is proportional to the square of its input. The control channel individual to the detector element and the control channels individual to the orienting elements are referred to hereinafter as the detecting and orienting channels respectively. The signal outputs of the control channels are combined to provide a signal voltage which is proportional to the sum of the squares of the field components or to the total field, this voltage being produced entirely by the detecting channel when the magnetometer is in its desired orientation.

The combined output signal is filtered, rectified, and applied to a low-frequency amplifier having three ranges of frequency response peaked approximately at .06 cycle per second, .12 cycle per second and zero frequency, these frequencies corresponding to towing speed ranges of 20–50, 50–120, and 0–20 knots, respectively. For the detection of submarines by planes flying at speeds from 60 to 120 knots, the second range is used, in which case the instrument is a zero-center device giving no response when moved through a low-gradient field and thus avoiding the effects of drift, day-to-day variations in the earth's magnetic field, and low-gradient geological anomalies. To use the instrument in slower aircraft, such as airships and helicopters, the other ranges are used in order to take advantage of the ability of the slower aircraft to hover over an expected signal source. In geophysical surveying, the third range providing zero frequency response is the only range used for the reason that the continuous recording of total field is desired rather than isolated transient signals which depend on the time rate of change of the field.

Signal voltages are selected from the orienting channels in the converter unit and are preamplified therein and thereafter transmitted to corresponding orienting channels in the oscillator units wherein they are further amplified and beat in mixer tubes to provide suitable operating current for the orienting motors.

The control box includes a biasing circuit for nulling out all of the ambient field except approximately 5000 gammas at the detecting element. The biasing circuit supplies current to the winding of the detecting element by a battery of dry cells acting through a potentiometer and a 30-step voltage divider. The range of the nulling field is approximately 25,000 to 70,000 gammas, each step of the voltage divider adding approximately 1,500 gammas to the field at the element. When a portion of the ambient field is nulled out in the foregoing manner, an arrangement providing two element squared compensation is provided for correction during misalignment of the detector element, and this arrangement provides a first order approximation of the total value of the field.

The camera illustrated in Fig. 2 may be of any suitable type adaptable for vertical photography of the terrain from the aircraft 10, the field of view of the camera being substantially as indicated by the dashed lines in Fig. 1 whereby a series of images disposed along a given traverse of the aircraft may be recorded on the film of the camera. For this purpose, the camera may be a conventional moving picture camera or a still camera having provisions for making a great number of pictures of the terrain at selected positions disposed along the traverse.

An optical system is provided for causing an image of the trace 14 to be applied to the film 16 of the camera. To this end, a mirror 17 is interposed within the field of view of the camera as indicated by the dashed lines 18—18 of Fig. 2, whereby the field of view is split as indicated by the lines 18—19. A second mirror 20 is so disposed in spaced relation to mirror 17 and to the milliammeter recorder as to cause a portion of the milliammeter trace 14 and a clock 21 resting on the recorder to be included within the split field of view of the camera.

A lens 22 of sufficient diameter to intercept the split field of view of the camera is placed at an optical distance from the tape equal to the focal length of the lens. By reason of this arrangement, the trace and watch are seen by the camera lens as virtual objects at an infinite hyperfocal distance. Thus, the images of these objects are formed on the same focal palne as the image of the terrain.

The watch 21 serves as an expedient means for indicating the altitude at which a given traverse is made, the watch for this purpose having a stop-watch second hand 23 which may be set manually at a desired position corresponding to a given altitude. Thus, for example, when the stop hand 23 is set at numeral 1 on the clock, the clock may indicate an altitude of 1,000 feet.

In the use of the aforedescribed apparatus in conducting magnetic surveys from an aircraft, the aircraft is caused to move along a predetermined traverse, or system of traverses, during which a continuous trace corresponding to variations in the embient magnetic field above the earth is produced, and concurrently therewith, photographs are made simultaneously of the trace, watch, and terrain at spaced intervals along the traverse.

Assuming that a magnetic survey is conducted for the purpose of detecting a camouflaged gun emplacement 25 disposed along the traverse indicated in Fig. 1, and assuming further that the control box is adjusted so as to cause the instrument to respond to frequencies in the range of .12 cycle per second, variation in the signal trace 14 appears as the detector passes over the gun emplacement, and thereafter by reference to the photographs made along the traverse, the approximate position of the signal producing source can be determined. Similarly, the correlation between visible objects such, for example, as the water tank 26 and the signal variation obtained therefrom can be accurately established, thus permitting a precise analysis of the sensitivity characteristics of the magnetometer.

By flying a systematic series of adjoining and transverse traverses at a given altitude with the control box set for zero frequency response, and plotting the relationship between the variations in the magnetic field strength and the ground positions corresponding thereto on a chart, it is possible to draw isomagnetic contours from which logical inferences concerning the nature of the substrata 27 can be established. If using the same technique, isomagnetic contours at different altitudes are produced and their ground positions correlated, it is then possible to making accurate quantitative deductions as to the nature of the substrata, the watch settings, as appearing on the film, indicating the different altitudes at which the several traverses were made.

With the instrument operating at zero frequency response, the base settings on the control box are adjusted as frequently as necessary to prevent the pen 13 from moving off the paper 15, and the base settings at such times are either marked on the recording paper itself, or in a log book, or otherwise recorded in any suitable manner.

From the foregoing, it should now be apparent that a method and apparatus has been provided which fulfills the aforestated objects of the invention. Moreover, while the invention has been described with particularity with reference to specific methods and apparatus for practicing the invention, it will be apparent to those skilled in the art, upon obtaining an understanading of the invention, that the invention is susceptible of various additional methods and apparatus for practicing the same without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In apparatus of the character disclosed for conducting magnetic explorations, the combination of means for producing a record trace indicative of variations in the total value of the ambient magnetic field as the aircraft moves along a predetermined traverse, means disposed in proximity to said trace and indicative of the altitude of the traverse, a camera having a film adapted to receive a plurality of images of the terrain beneath the plumb point of the aircraft and disposed along the traverse thereof, a first optical element adapted to reflect images of said altitude indicating means and a portion of said trace respectively, a second optical element interposed within the field of view of the camera and adapted to superimpose on said film adjacent each of said terrain images thereon said reflected images of the altitude indicating means and trace, and a third optical element interposed between said first and second optical elements for causing the images of the altitude indicating means and trace to be formed on the film in the same focal plane as the images of the terrain.

2. In apparatus of the character disclosed for conducting magnetic explorations, the combination of means for producing a record trace indicative of variations in the total value of the ambient magnetic field as the aircraft moves along a predetermined traverse, means disposed in proximity to said trace and indicative of the altitude of the traverse, a camera having a film adapted to receive a plurality of images of the terrain beneath the plumb point of the aircraft and disposed along the traverse thereof, a first optical element interposed within the field of view of the camera and adapted to reflect images of said altitude indicating means and a portion of said trace on said film adjacent each of said terrain images thereon, and a second optical element interposed between said first element and the altitude indicating means and trace for causing said images thereof to be formed on the film in the same focal plane as the images of the terrain.

References Cited in the file of this patent

UNITED STATES PATENTS

| | | |
|---|---|---|
| 1,331,978 | Brock et al. | Feb. 24, 1920 |
| 1,585,484 | Gasser | May 18, 1926 |
| 1,658,537 | Reinbold | Feb. 7, 1928 |
| 1,912,485 | Kothny | June 6, 1933 |
| 2,167,630 | Bazzoni et al. | Aug. 1, 1939 |
| 2,338,991 | Arnold | Jan. 11, 1944 |
| 2,406,870 | Vacquier | Sept. 3, 1946 |
| 2,424,772 | Rieber | July 29, 1947 |
| 2,428,034 | Nichols et al. | Sept. 30, 1947 |
| 2,468,554 | Hull | Apr. 26, 1949 |
| 2,518,513 | Wyckoff | Aug. 15, 1950 |
| 2,555,209 | Vacquier | May 29, 1951 |

FOREIGN PATENTS

| | | |
|---|---|---|
| 319,867 | Great Britain | Oct. 3, 1929 |

OTHER REFERENCES

Heiland: "A. I. M. E. Transactions," 1932, pp. 213–214.

Heiland: "Engineering & Mining Journal," Dec. 1935, pp. 609–610.

Logachev: "Geophysics," April 1946, pp. 135–157.

"The Airborne Magnetometer," Geophysics, July 1946, pp. 321–334.